United States Patent [19]
Baso et al.

[11] 3,740,614
[45] June 19, 1973

[54] FRAME FOR MOUNTING ELECTRICAL EQUIPMENT

[75] Inventors: Miklos Baso; Edgar Wiessner, both of Amberg, Germany

[73] Assignee: Siemens Aktiengesellschaft, Berlin and Munich, Germany

[22] Filed: Sept. 28, 1971

[21] Appl. No.: 184,469

[30] Foreign Application Priority Data
Oct. 1, 1970 Germany.................. P 20 48 237.5
Aug. 14, 1971 Germany.................. P 21 40 801.5

[52] U.S. Cl. ............... 317/99, 317/122, 174/72 A, 85/1 H
[51] Int. Cl. .......................... H02b 1/04, H02b 1/20
[58] Field of Search .................. 317/99, 103, 122; 174/72 A; 248/224, 243; 85/1 H

[56] References Cited
UNITED STATES PATENTS

| | | | |
|---|---|---|---|
| 2,140,376 | 12/1938 | Anderson........................... | 317/122 |
| 3,441,806 | 4/1969 | Schwing........................... | 174/72 A |
| 1,639,310 | 8/1927 | Richardson...................... | 174/72 A |
| 2,219,887 | 10/1940 | Bowly............................... | 317/122 |
| 3,088,055 | 4/1963 | Schwing........................... | 174/72 A |
| 2,388,658 | 11/1945 | Pumphrey......................... | 85/1 H |
| 2,099,116 | 11/1937 | Kalmback......................... | 85/1 H |

FOREIGN PATENTS OR APPLICATIONS
1,256,759  12/1967  Germany

*Primary Examiner*—Robert K. Schaefer
*Assistant Examiner*—Gerald P. Tolin
*Attorney*—Arthur E. Wilfond, Herbert L. Lerner and Daniel J. Tick

[57] ABSTRACT

A frame comprises spaced equipment carrier units for mounting electrical equipment and accommodates the electrical wiring of such equipment in wiring spaces beneath the mounting surface of the electrical equipment carriers. The equipment carrier units are affixed to a base place by spacers arranged in mushroom stem fashion. The wiring is thus disposable beneath the electrical equipment. Comb plates are provided between the equipment carrier units and the base plate for holding individual wires between the comb teeth thereof. Lip-shaped extensions are provided in the comb teeth for holding the individual wires between them. The lip-shaped extensions have cutouts or projections formed therein which provide detent action for the individual electrical wires in the direction of their insertion between the comb teeth.

8 Claims, 16 Drawing Figures

Patented June 19, 1973
3,740,614
4 Sheets-Sheet 1
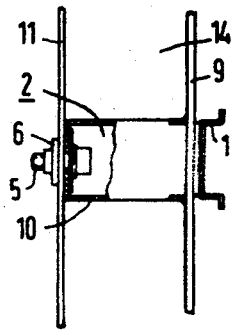
Fig. 2
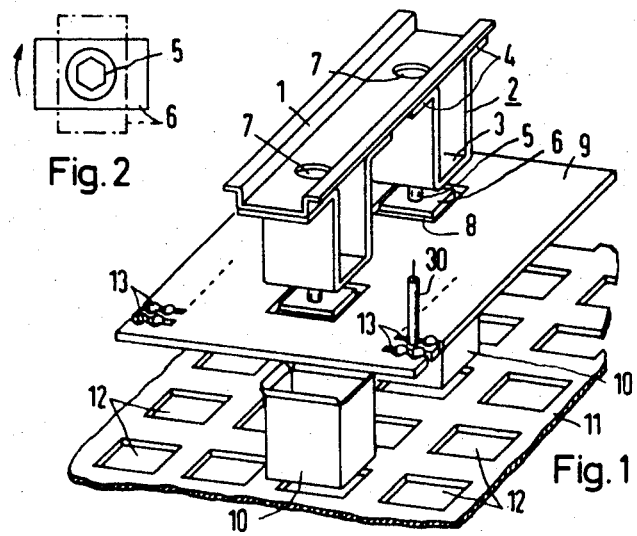
Fig. 1
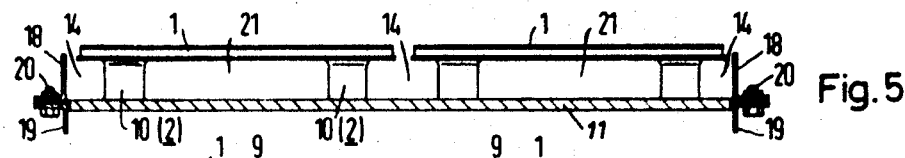
Fig. 3
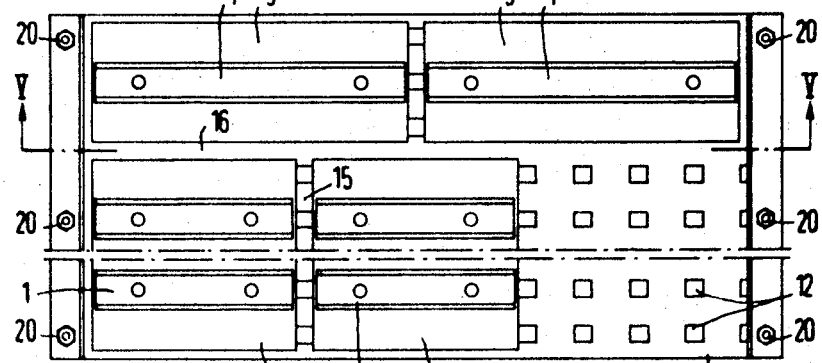
Fig. 5
Fig. 4
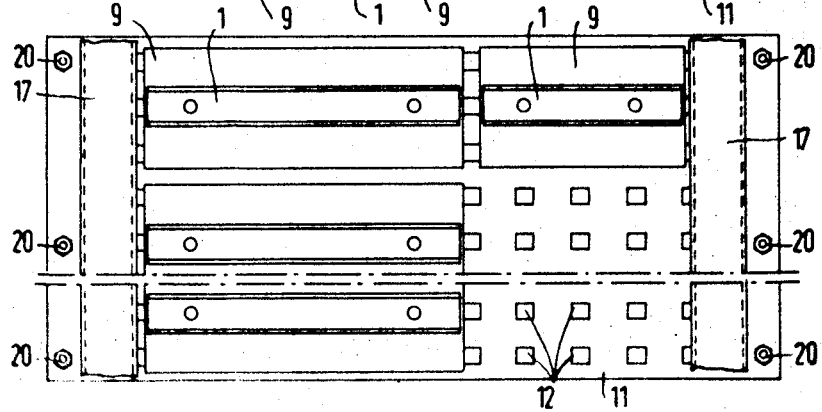
Fig. 6

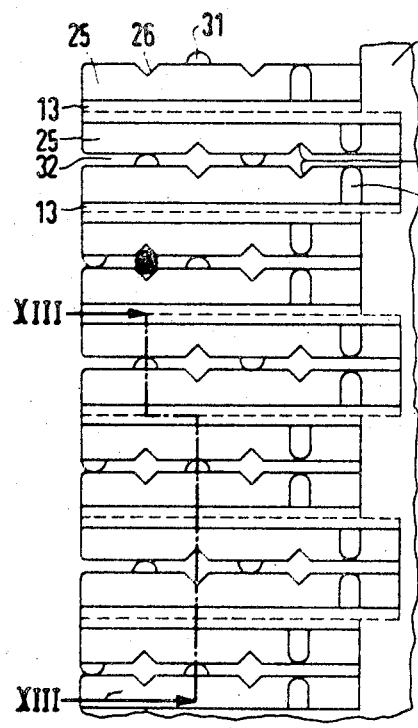
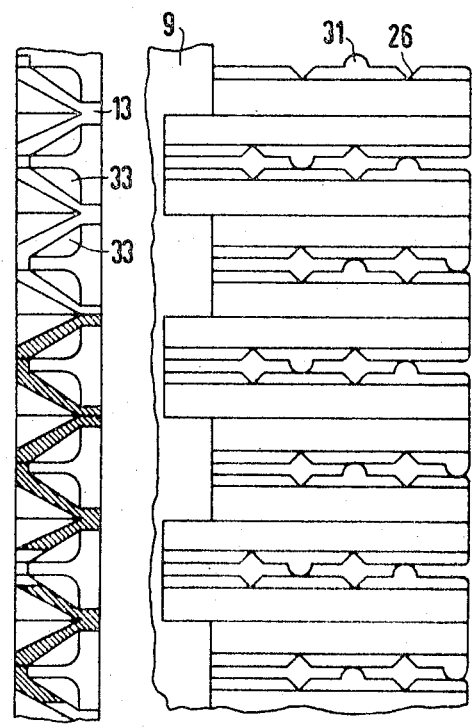
Fig.10    Fig.13    Fig.12
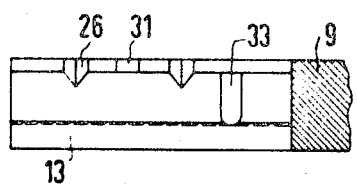
Fig.11

FRAME FOR MOUNTING ELECTRICAL EQUIPMENT

This invention relates to a frame for mounting electrical equipment. More particularly, the invention relates to a frame comprising equipment carrier units spaced from each other for mounting electrical equipment and for accommodating the electrical wiring of such equipment in wiring spaces beneath the mounting surface of the equipment.

In a known frame of the aforedescribed type, as disclosed in German Published Pat. application No. 1,256,759, groove-like channels are provided. The part of the channels which is open toward the front side of the rack serves to receive the wiring. The bent edges of the channels are suitably affixed by, for example, welding, riveting, cementing, or bolting to perforated panels having regular hole spacing for receiving the electrical equipment. Although it is possible in the aforedescribed known frame to insert the wires from the front without having to thread them through holes, the width of the channels must be greater than would be required for the accessibility of the terminals of the electrical equipment, because the depth of the channels cannot be increased in order to accommodate all the wiring cables. Since the aforedescribed frame requires relatively large space, it is relatively expensive, since the channels meet each other at an angle and must be welded together. Furthermore, the perforated panels must be subsequently affixed to the channel. The size of the perforated panels must therefore be selected prior to the welding of the channels thereto, so that there is a considerable deficiency in the flexibility of the known frame.

An object of the invention is to provide a frame for mounting electrical equipment in which electrical equipment may be arranged as close to each other as the accessibility of their terminals permits.

Another object of the invention is to provide a frame for mounting electrical equipment in which the wiring of the equipment is readily accommodated beneath such equipment.

Still another object of the invention is to provide a frame for mounting electrical equipment which is of simple structure, but is efficient, effective and reliable.

Another object of the invention is to provide a frame for mounting electrical equipment which may be constructed in many ways with elements of simple structure.

In accordance with the invention, a frame for mounting electrical equipment and for accommodating the electrical wiring of the equipment having spaced equipment carrier units and wiring spaces beneath the mounting surfaces of the equipment carrier units for the wiring, comprises a base plate and a plurality of spacers extending from the equipment carrier units in mushroom stem fashion and affixing the equipment carrier units to the base plate. The equipment carrier units comprise mounting beam sections. Comb plates comprising insulating material having comb teeth are positioned between the equipment carrier units and the base plate for holding the electrical wires of electrical equipment mounted on the frame between the comb teeth.

A plurality of latches engage the base plate and each of a plurality of fastening means affixes a corresponding one of the spacers to a corresponding one of the latches thereby affixing the equipment carrier units to the base plate.

Each of the spacers comprises a substantially U-shaped bracket having a pair of spaced arms affixed to an equipment carrier unit and a head joining the arms in an area spaced from the equipment carrier unit. Each of a plurality of fastening bolts is provided in the head of a corresponding one of the U-shaped brackets for affixing the spacers and thereby the equipment carrier units to the base plate.

A comb plate comprises insulating material having comb teeth and openings formed therethrough. Each of a plurality of insulating sleeves surrounds a corresponding one of the spacers and extends through a corresponding one of the openings formed through the comb plate for holding the comb plate against the equipment carrier units. The comb teeth of the comb plate are provided with resilient lips for holding individual electrical wires of electrical equipment mounted on the frame. The lips of the comb teeth of the comb plate have cutouts and projections formed therein and provide detent action for the individual electrical wires in the direction of their insertion between the comb teeth. The cutouts extend to the opening of the lips of the comb teeth. The lips of the comb teeth extend at an angle different from 90° with respect to the longitudinal direction of the individual electrical wires.

In accordance with the invention, the frame for mounting electrical equipment comprises spaced equipment carrier units affixed to a base plate by spacers extending from the equipment carrier units in mushroom stem fashion. It is therefore possible to accommodate the wiring of the electrical equipment beneath the equipment carrier units without the necessity for bringing the wires through openings. The distance between the equipment carrier units may theoretically be reduced to that required for the insertion of the individual wires. The mounting of the electrical equipment on the equipment carrier units is substantially simplified if the equipment carrier units are sections of mounting beams. The connecting wires to be attached to the electrical equipment may be neatly arranged as they emerge from the wiring space between the equipment carrier units if comb plates of insulating material are provided between the equipment carrier units and the base plate for holding the individual wires. This also prevents the wire insulation from damage in the event of movement of the frame. The equipment carrier units are held by latches which engage the base plate, which base plate functions as a panel affixed to the spacers. This provides a large number of possible variations for the arrangement of the equipment carrier units and permits the installation of the equipment carrier units by non-skilled personnel outside the shop.

In a simple embodiment, each of the spacers comprises a U-shaped bracket having a pair of spaced arms affixed to an equipment carrier unit and a head joining the arms in an area spaced from the equipment carrier unit. Fastening means are provided in the head of each of the U-shaped brackets for affixing the brackets to the base plate. The ends of the arms adjacent the equipment carrier units are bent outward at right angles to the arms to permit them to be readily affixed to the equipment carrier units. The brackets may be affixed to the equipment carrier units in any suitable manner such as, for example, welding. In order to prevent damage to the electrical conductors at the spacers, the spacers are preferably surrounded by insulating sleeves between the equipment carrier units and the base plate. The insulating sleeves extend through holes in the comb plates and function also to push the comb plates toward the equipment carrier units in an advantageous manner.

The comb plates have comb teeth which are manufactured with facility by punching from a thin sheet so that they extend over the entire thickness of the comb plates. The comb teeth may move transversely to the direction of insertion of adjacent individual electrical wires or conductors and may be pushed into corresponding slots in sequence. In this arrangement, the movement of the comb teeth is appreciably hindered if individual electrical wires or conductors are already accommodated in the slots formed by the comb teeth which are adjacent to the slot to be utilized.

The comb plates may be further improved so that individual electrical conductors or wires may be inserted with relatively secure mounting. This is achieved in a simple manner by providing the comb teeth with elastically resilient lips for holding the individual wires. In order to accommodate individual wires or conductors of different diameters simultaneously in one slot and securely mount individual wires or conductors, the lips of the comb teeth have curves and projections formed therein for providing detent action for the individual electrical wires in the direction of their insertion between the comb teeth. Within specified limits, the holding of the individual wires becomes independent of the diameters of the individual conductors if the cutouts are provided as slots extending transversely to the longitudinal direction of the lips and the cutouts extend to the opening of the lips at the comb plate. If the lips extend at an angle different from 90° with respect to the longitudinal direction of the individual wires, a relatively large width of the lips, a small spacing of the teeth and a simple determination of the resiliency of the lips are obtained.

In order that the invention may be readily carried into effect, it will now be described with reference to the accompanying drawings, wherein:

FIG. 1 is an exploded perspective view of the frame of the invention for mounting electrical equipment;

FIG. 2 is a top view of a latch for fastening the spacers to the base plate;

FIG. 3 is a cross-sectional view through an equipment carrier affixed to the base plate;

FIG. 4 is a top view of a possible arrangement of the equipment carrier units on a base plate;

FIG. 5 is a cross-sectional view taken along the lines V—V of FIG. 4.

FIG. 6 is a top view of another possible arrangement of the equipment carrier units on the base plate with a cable channel mounted on the base plate for conducting the wires extending from the frame;

FIGS. 10, 11 and 12 are different views of a comb slot arrangement having projections and cutouts;

FIG. 13 is a cross-sectional view, taken along the lines XIII—XIII of FIG. 10;

In the FIGS., the same components are identified by the same reference numerals.

Figure 7:
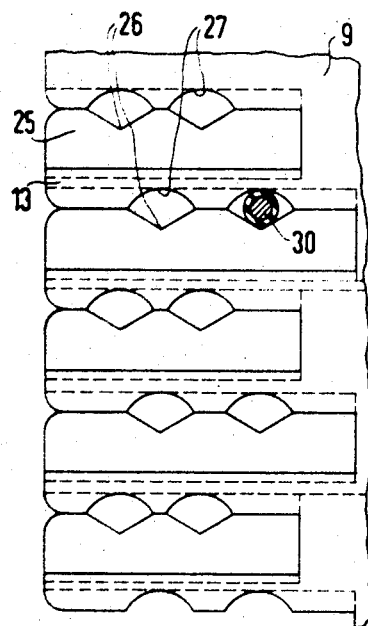
FIGS. 7, 8 and 9 are different views, partly in section, of a comb plate having lips cut out on one side in semicircular configuration and on the other side in triangular configuration at the comb teeth.

The frame for mounting electrical equipment and for accommodating the electrical wiring of such equipment is shown in FIG. 1. The electrical equipment is not shown in detail. The frame, as shown in FIG. 1, comprises a plurality of equipment carrier units 1, of which one is shown. The equipment carrier unit 1 comprises a section of a standard mounting beam. A pair of U-shaped brackets function as spacers for the equipment carrier unit 1.

The spacer 2 has a pair of parallel arms each of which is bent outwardly at right angles to its corresponding arm to provide a portion 4 which is parallel and adjacent to the bottom of the mounting beam 1. The portions 4 of the arms of the spacer 2 are welded to the mounting beam. The U-shaped bracket 2 also has a head 3 which joins the two arms thereof. A fastening bolt 5 or any other suitable fastening means is provided in the head 3 of the spacer 2. The bolt 5 cooperates with a latch 6 to affix the spacer 2 to a base plate 11. Cutouts 7 are formed through the equipment carrier unit 1 to permit access to the fastening of the fastening bolt 5.

A plurality of insulating sleeves 10 are provided. Each insulating sleeve 10 surrounds a corresponding one of the spacers 2. A comb plate 9 has a plurality of openings 8 formed therethrough. The insulating sleeves 10 are passed through the openings 8 in the comb plate 9 and said comb plate is pushed over said insulating sleeves, and therefore also the spacers 2, and is held by said insulating sleeves against the mounting beam 1. The insulating sleeves 10 in turn rest against the base plate 11 which forms the ground plane. The base plate 11 has a plurality of cutouts or openings 12 formed therethrough and the latches 6 are passed through said openings or cutouts.

As seen in FIG. 1, the comb plate 9 has comb teeth 13 which are preferably formed or shaped so that they surround the wire or electrical conductor introduced therein with a detent action. Therefore, an electrical conductor or electrical wire leading to the electrical equipment mounted on the frame of the invention is fixed in position in a specific manner. The comb plate or plates 9 therefore define, on the one hand, the wiring space beneath the equipment carrier unit 1 and beneath said comb plate, as well as above the base plate 11. The comb plate or plates 9 function, on the other hand, to fix and secure the individual wires or electrical conductors as they emerge from a wiring space 14, as shown in FIGS. 3 and 5.

FIGS. 4 and 6 illustrate different arrangements of the equipment carrier units 1. The different lengths of the equipment carrier units 1 do not interfere with the flexible electrical wiring, since in the vertical direction spaces 15 and in the horizontal direction spaces 16 are available between said equipment carrier units, so that the electrical wires may be arranged in any desired manner beneath the comb plate or plates 9. In the arrangement of FIG. 6, wiring channels 17 comprising plastic material, are additionally provided, for example, to conduct the wires away from the frame in vertical directions.

In the arrangement of FIG. 4, a side wall 18 is provided by an angle member of plastic material affixed to a support angle 19. This prevents the spilling over of the wires at the side of the frame. Fastening bolts 20 are utilized to connect the side wall 18 to the support angles 19 and the base plate 11. If the space available beneath the equipment carrier units 1 in the illustrated embodiment of the invention is not sufficient to accommodate the electrical wiring, the spacers 2 may be moved closer toward each other, toward the center of each equipment carrier unit, so that a space 21 beneath each equipment carrier unit and between its corresponding spacers becomes smaller. It may also be of advantage to stagger the depth of the comb teeth 13, so that the positions of the wires may be fixed at different distances from the ends of the comb plate 9.

The frame of the invention therefore permits the insertion of the electrical conductors from the front without the requirement that the wires be threaded through holes or openings. Additionally, the frame of the invention, compared to known frames provided with wiring channels, provides a substantial saving in wire length. The prefabricated equipment carrier units 1 release the person making the panel from the time-consuming minor operations such as drilling, tapping, scribing, and the like, and permit the work to be done in the shop in an efficient manner.

As may be seen, especially in FIGS. 4 and 6, it is entirely possible to mount larger components such as, for example, transformers or heavy switch equipment, on the base plate 11 in addition to the equipment carrier units 1. The space on the base plate 11 which is not occupied by the carrier equipment units 1 serves this purpose.

Figure 8:
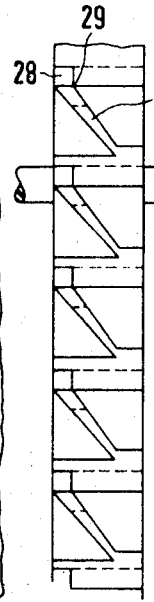
Figure 9:
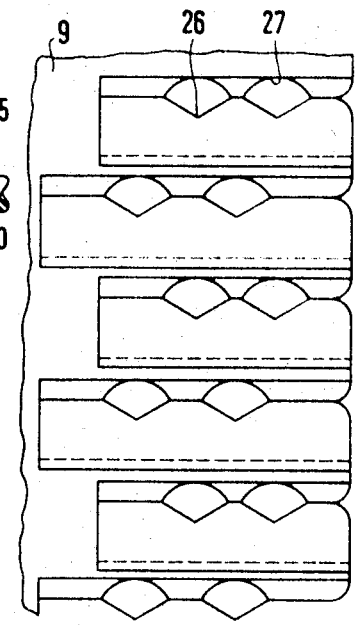

In the comb plate 9 of FIGS. 7, 8 and 9, the comb teeth 13 are provided on only one side with resilient lips 25 which are inserted into triangularly shaped cutouts 26. Circular segment-shaped cutouts 27 are provided in the comb teeth 13 themselves. The circular segment-shaped cutouts 27 face the triangular cutouts 26. In order to assure good contact of the lips 25 at the comb teeth 13 in those parts where there are no cutouts, and to be able nevertheless to injection mold or press the comb teeth in a simple manner, cutouts 28 are provided adjacent to the lips 25 in the comb plate, so that said lips and said comb teeth are positioned alongside each other in knife-edge fashion.

The knife-edge 29 is shown in FIG. 8. As shown in FIG. 8, the lips 25 extend in an angle different from 90° to the longitudinal direction of the individual wires or electrical conductors 30. This results in the obtaining of a greater width of the lips 25 and permits said lips to be made more resilient, with greater thickness.

FIGS. 10, 11, 12 and 13 show a comb plate 9 in which the lips 25 are provided on both sides of the comb teeth 13. The lips 25 are provided with triangularly shaped cutouts 26 and have segment-shaped projections 31. In the embodiment of FIGS. 10, 11, 12 and 13, the lips 25 are spaced from each other to form a slot 32 which is interrupted by the projections 31. Nose-like projections 33 are provided in the comb plate 9 to prevent an electrical conductor from being inserted too deeply and thereby prevent deforming or shearing of the lips at the end of the slots.

Figure 14:
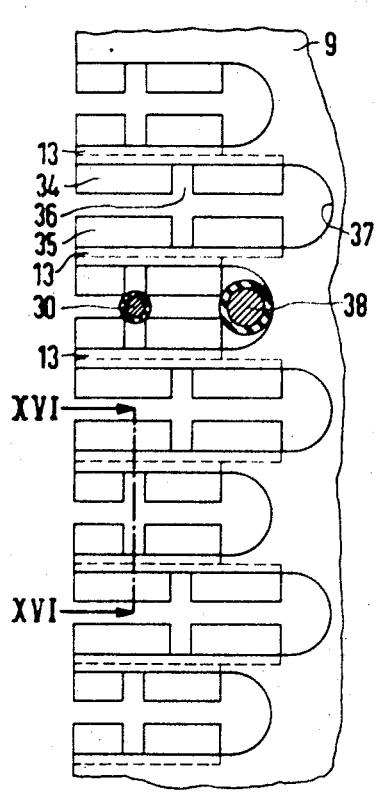
FIG. 14 is a top view of a comb plate having lips provided in slots.
Figure 16:
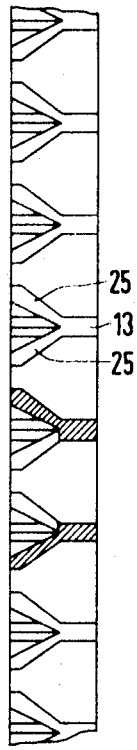
FIG. 16 is a cross-sectional view, taken along the lines XVI—XVI of FIG. 14.
Figure 15:
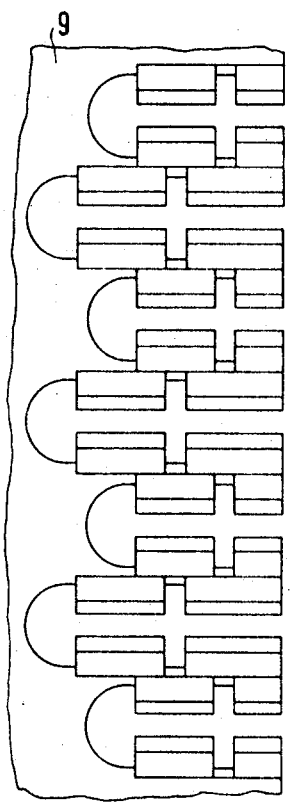
FIG. 15 is a bottom view of the comb plate of FIG. 14.

A two-part pushing tool without a slide may be utilized in the embodiment of FIGS. 10 to 13 and may also be utilized in the embodiment of FIGS. 14, 15 and 16.

In the embodiment of FIGS. 14, 15 and 16, the lips 25, as shown in FIG. 16, are connected to the teeth 13 in Y-fashion, with the open end of the Y pointing toward the other side of the comb plate 9. The lips 25 are formed by rectangularly shaped parts 34 and 35 which face each other and extend to the bottom of the comb teeth 13, that is, to the beginning of the lips in the comb plate 9. Slot-shaped cutouts 36 are provided.

In the embodiment of FIGS. 14, 15 and 16, the comb teeth 13 merge into each other via a semicircular arc 37. This enables an electrical conductor 38 having a cross-sectional area larger than an electrical conductor 30 to be retained in position without adverse effect on the conductor 30, although the conductor 30 is positioned adjacent the conductor 38.

It is readily seen from the embodiments of FIGS. 7, 8 and 9, 10, 11, 12 and 13, and 14, 15 and 16, that the frame of the invention permits the secure positioning of the individual wires by simple means. The means for securely positioning the individual wires are therefore provided practically without cost in the manufacture of the comb plates. Particularly advantageous materials for the comb plates are polyamides, polypropylene and polyvinyl chloride.

While the invention has been described by means of specific examples and in specific embodiments, we do not wish to be limited thereto, for obvious modifications will occur to those skilled in the art without departing from the spirit and scope of the invention.

We claim:

1. A structure assembled of appliance carrier units spaced from each other, provided for holding electrical appliances and for accommodating the electrical wiring for said appliances, the structure including wiring chambers which are set back with respect to clamping faces of the appliances, wherein the units are affixed to a base plate by first spacers of stem form and are provided with comb plates of insulating material having dovetails for holding the individual wires between the comb dovetails, said comb plates being secured to said clamping faces, said structure also comprising second spacers connected to said first spacers and comprising U-shaped brackets having bottoms provided with fastening means for securing said second spacers to the respective carrier units.

2. A structure as claimed in claim 1, further comprising an insulating sleeve enclosing said first and second spacers between the base plate and the unit comb plate.

3. A structure as claimed in claim 1, further comprising latches affixed to said first spacers and engaging behind the base plate.

4. A structure as claimed in claim 1, wherein said comb dovetails comprise comb teeth and openings formed therethrough, and a plurality of insulating sleeves each surrounding a corresponding first and second spacer and extending through a corresponding one of the openings formed through the comb plate and holding the comb plate against the equipment carrier units.

5. A structure as claimed in claim 1, wherein the comb plate is positioned between the equipment carrier units and the base plate, the comb plate comprising insulating material having comb teeth provided with resilient lips for holding individual electrical wires of electrical equipment mounted on the frame.

6. A structure as claimed in claim 5, wherein the lips of the comb teeth of the comb plate have cutouts and projections formed therein and provide detent action for the individual electrical wires in the direction of their insertion between the comb teeth.

7. A structure as claimed in claim 6, wherein the cut-outs extend to the opening of lips of the comb teeth.

8. A structure as claimed in claim 6, wherein the lips of the comb teeth extend at an angle different from 90° with respect to the longitudinal direction of the individual electrical wires.

* * * * *